Figure 1:
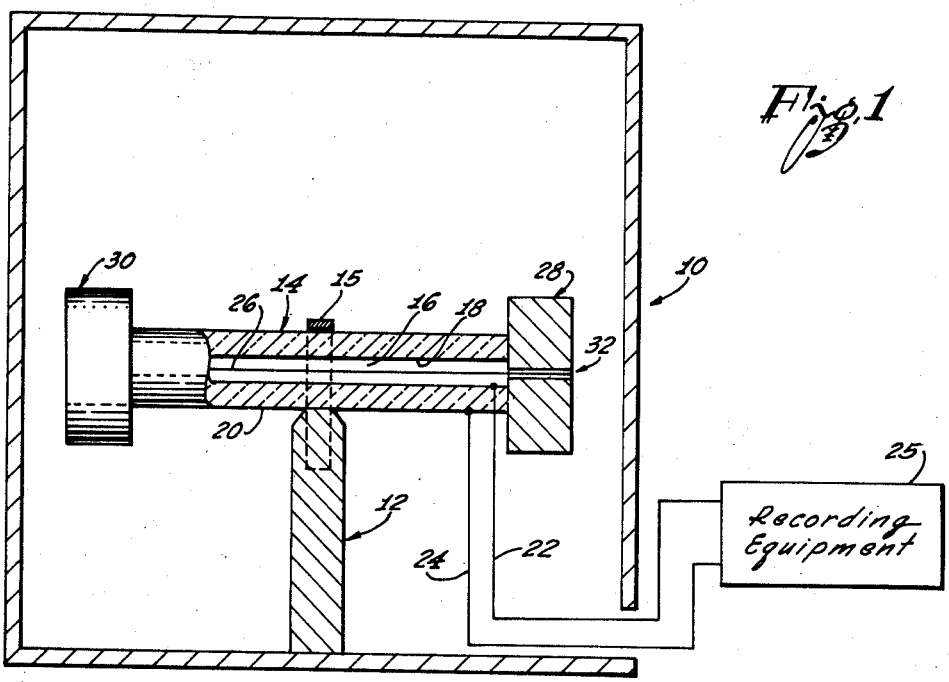

June 1, 1965

L. FORREST 3,186,237

PIEZOELECTRIC TRANSDUCER

Filed Oct. 17, 1961

2 Sheets-Sheet 1

INVENTOR:
Lew Forrest

Agent

June 1, 1965   L. FORREST   3,186,237
PIEZOELECTRIC TRANSDUCER
Filed Oct. 17, 1961

2 Sheets-Sheet 2

INVENTOR:
Lew Forrest

Agent

United States Patent Office 3,186,237
Patented June 1, 1965

3,186,237
PIEZOELECTRIC TRANSDUCER
Lew Forrest, Los Angeles, Calif., assignor to Litton
Systems, Inc., Beverly Hills, Calif.
Filed Oct. 17, 1961, Ser. No. 145,716
6 Claims. (Cl. 73—517)

This invention relates to piezoelectric transducers and, more particularly, is concerned with the improvement of accelerometers in which a piezoelectric crystal is subjected to deformation by the acceleration to be measured.

The piezoelectric effect is well known and has been widely used in numerous fields in which it is desired to transform mechanical energy into electrical energy, and vice versa, the more important applications including force gauges, pressure gauges and accelerometers. When employing piezoelectric crystals to produce an electrical output, it must be noted that a piezoelectric crystal is essentially a charge generator and not a current generator. Accordingly, and in the specific field of accelerometers, piezoelectric transducers are unable to directly measure or monitor constant accelerations. However, this shortcoming is offset by a number of advantages such as small dimensions and low costs with respect to both manufacturing and repair, since repair, for example, is accomplished in most instances merely by substituting a new crystal.

Referring now to piezoelectric accelerometers, two distinct groups of devices have been developed. The first group may be referred to as the compression type and is characterized by an arrangement which includes a spring-loaded mass which tends to compress the crystal, frequently referred to as the billet, in the direction of the acceleration to be measured. The mass of known value is urged toward or away from the crystal by an additional force proportional to acceleration and changing with acceleration conditions. These acceleration conditions may include either acceleration or retardation, resulting from steady state or transient vibrations or shocks.

In such spring-loaded compression type piezoelectric accelerometers, the crystal rests on a base. The direction of the force exerted by the spring on the mass, the center of gravity of the mass and the geometric center of the crystal are aligned with the direction in which acceleration is to be measured. Since the presence of a mass necessarily increases the sensitivity of the accelerometer, the spring-loaded compression type has frequently been selected and preferred, as compared to the second type which will be described below.

It is known that the piezoelectric effect is observed not only in connection with compression of the crystal but also with bending or flexure. Accordingly, a second type of accelerometer employs a crystal mounted so that charge is generated when it is subject to bending or flexure upon acceleration. Accelerometers of this type are appropriately referred to as "bender" type piezoelectric accelerometers, or as "benders." As an essential characteristic of the "bender" type accelerometer, it may be stated that the point of force exerted by the acceleration to be measured, which coincides with the center of gravity, is offset with respect to the point of suspension, to produce a lever action which tends to flex or bend the crystal when subject to acceleration.

Two distinct "bender" type accelerometers have been developed. One of them involves a generally elongated crystal or billet which is rigidly mounted at one end, with the other end remaining free, and the longitudinal axis of the elongated billet normally forming a right angle with the direction of acceleration. For obvious reasons, this type of accelerometer may be termed a cantilever type piezoelectric accelerometer.

Additionally, and referring now to the second group of benders, arrangements have been proposed in which a plate-shaped billet is suspended in the center, while its periphery remains free, the periphery exhibiting the maximum deflection upon acceleration. Since generally a rod-shaped holder centrally supports such plate-shaped billet, the described arrangement may be termed an umbrella type or mushroom type piezoelectric crystal accelerometer. Inversely, an arrangement operating in a similar manner is obtained by supporting the plate-shaped billet along its periphery, so that the center portion of the crystal exhibits the maximum deflection.

It will be understood from the foregoing general discussion that the bender type piezoelectric accelerometer is one in which the crystal is subjected to flexure by rigidly supporting it at a location which is offset with respect to the center of gravity, in the direction of acceleration.

One of the shortcomings of bender type piezoelectric accelerometers resides in the comparatively little mechanical resistance of a cantilever suspended billet, so that the range of accelerating forces which can be measured is small. At this point it should be noted that accelerometers are widely used for determining severe vibration conditions and for measuring shocks resulting also in damped vibrations, so that piezoelectric crystals exhibiting low mechanical resistance, such as the bender type, are excluded from such applications in which strong forces must be measured. A further disadvantage of the bender type accelerometer, which term in accordance with the foregoing discussion includes both the cantilever and the umbrella or mushroom type, resides in the fact that, generally speaking, no additional mass can be assembled with the billet as is the case with the spring-loaded compression type set forth above. It will be understood that the presence of a mass would increase the risk of destruction of the billet under severe operating conditions or, in other terms, decrease the useful range of the device. Apparently, no bender type piezoelectric accelerometers have been employed as heavy duty transducers. On the other hand, it will be clear that the presence of a mass increases the sensitivity of the instrument. Therefore, and generally speaking, bender type accelerometers have been used in practice only in a limited number of applications.

Another point to be considered with respect to bender type piezoelectric accelerometers is the fact that a cantilever suspended crystal or billet constitutes a system having a natural frequency and it will be understood that no linearity of the output signal with respect to the force to be measured can be expected when the frequency applied to the instrument, for example, when testing vibrations, falls within a range near the natural frequency of the suspended billet. Linear response is obtained when the variable being measured is proportional to crystal flexure. It is known that this is true when the forcing frequency is less than about $\frac{1}{5}$ of the natural frequency. The low natural frequency characteristic of many bender type units therefore constitutes an undesirable limitation in shock and vibration measurements.

Accordingly, it is an important object of the present invention to improve piezoelectric transducers, especially bender type accelerometers.

Another object of this invention is the reinforcing of billets in accelerometers to impart sufficient strength to resist forces of shock or vibration which would otherwise break the crystal unit.

A further object of the invention is to increase the sensitivity of instruments of the type under consideration by including a mass associated with the billet. Further objects of this invention include extending the frequency range of vibrations to which the instrument responds with a substantially linear output, and providing arrangements for adjusting the frequency range of the device so that a total range is covered by one device which exceeds ranges of accelerometers employed heretofore.

In accordance with the invention, arrangements are provided for permanently stressing crystals in bender type accelerometers in a direction having a significant component perpendicular to the direction of the accelerations to be measured. More particularly, and referring to an accelerometer including a piezoelectric crystal in a cantilever type suspension arrangement so that it may be subjected to acceleration in one direction, a compressive force is simultaneously applied to the crystal in a direction which is perpendicular with respect to the direction of acceleration. This compressive force is maintained continuously and therefore exists during the step of determining the electromotive force developed as a function of acceleration conditions. When applying the principle of a compressive force to a cantilever type suspended piezoelectric billet having a longitudinal axis and mounted to be accelerated in a direction perpendicular with respect to its longitudinal axis, the billet is subjected to a compressive force in the direction of its longitudinal axis. It will be understood that the compressive force constituting one of the essential features of the present invention is not applied in the direction of acceleration as is the case with prior art spring-loaded compression type piezoelectric crystal accelerometers, but in a direction perpendicular with respect to it.

It has been found that the mechanical stress in the form of a compressive force applied to a bender type piezoelectric crystal results in a significant increase of mechanical strength. In accordance with an important feature of the invention, this increase permits mounting a mass at the free end of a cantilever type mounted billet so that the sensitivity of the instrument is greatly improved. As a further result of the mechanical stress exerted on the crystal in a direction perpendicular to the acceleration, the natural frequency of the crystal-mass assembly is increased so that a broad range of response is covered than is the case with prior art piezoelectric accelerometers, especially when used for determining the effects of shock and vibration.

In practice, and in accordance with another feature of the present invention, the magnitude of the compressive force may be adjustable so that the same instrument can be employed to sense acceleration in different frequency ranges.

In accordance with a further feature, when an elongated billet is used in a cantilever-suspension arrangement, one or a plurality of tensioning wires are provided for applying the compressive force to the crystal in the direction of its longitudinal axis.

Further features include such elongated billet having an axial bore through it, through which extends one single tension wire, alternate arrangements including a plurality of wires in conjunction with solid billets, and the provision of a regulating screw for adjustably setting the tension applied to the wire or wires and with it the compressive force to which the billet is subjected.

It will be understood from the foregoing general description that the concept disclosed herein, which may be defined as a prestressed bender type piezoelectric accelerometer, constitutes a considerable improvement over prior art devices of this type inasmuch as the prestressed crystal exhibits greatly improved properties, such as increased mechanical resistance. Therefore, the device may vibration and shock measurements required in the field of contemporary aircraft design and testing. High sensitivity is achieved as a result of the fact that a mass may be secured to the free end of a cantilever-type suspended crystal, and the natural frequency is shifted to a considerably higher range so that the response range in the case of vibration measurements is increased. Furthermore, by adjusting the compressive force as suggested herein, the frequency response range may be shifted for further increasing the total response range of the instrument.

Figure 2:
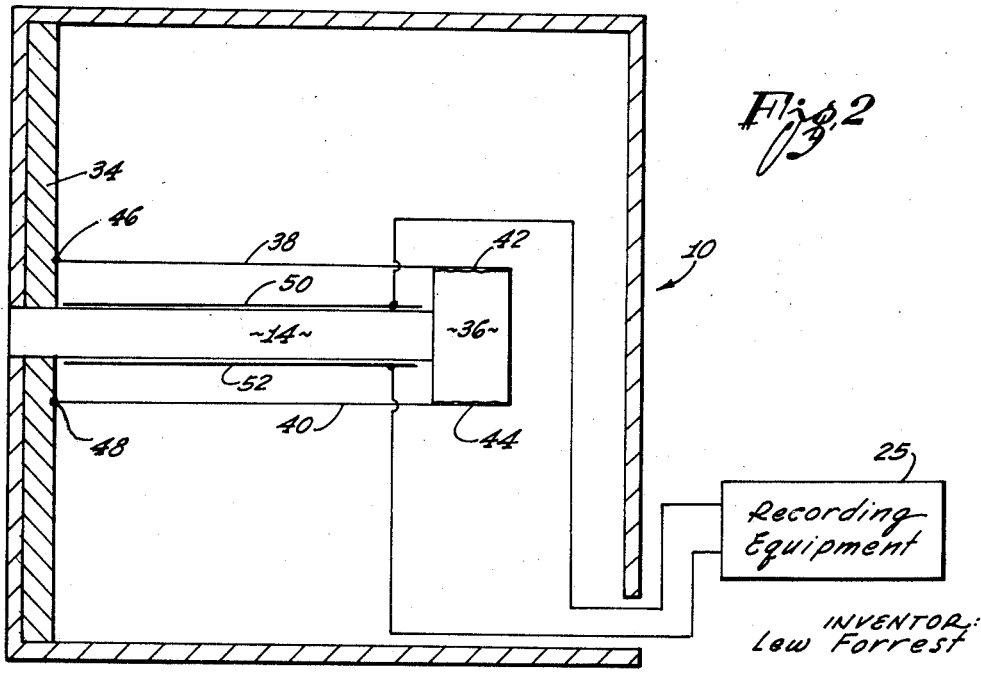
Figure 3:
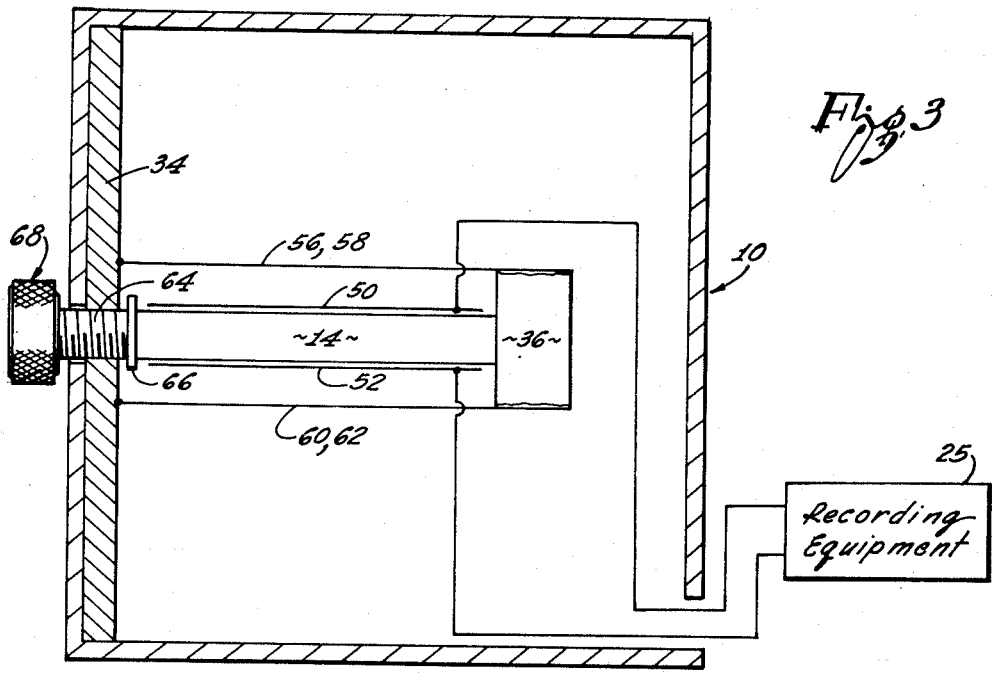
Figure 4:
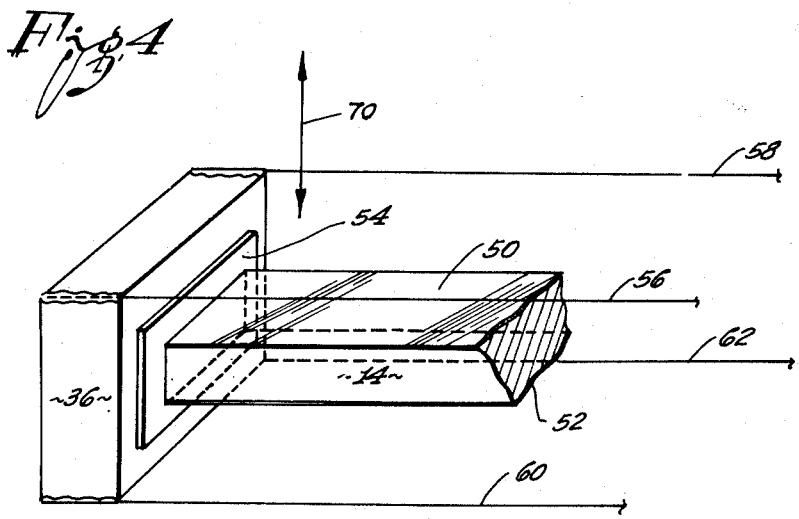

The invention will be better understood by a consideration of the following detailed description and of the accompanying drawing, in which:

FIGURE 1 is a schematic cross sectional view of an accelerometer in accordance with the present invention, FIGURE 2 is a schematic, partly cross sectional view through another embodiment of the invention, FIGURE 3 illustrates an alternative embodiment which includes arrangements for regulating the compressive force applied to the crystal; and FIGURE 4 is an isometric view of the end portion of the crystal of FIGURE 3, slightly modified.

Identical parts are designated by the same reference numerals throughout the figures.

Referring now to FIGURE 1, the embodiment of a piezoelectric accelerometer illustrated is of the type generally referred to as a "T-mount." In this figure, as well as in all of the other figures of the drawing, it is assumed that the direction of acceleration to be measured is in the plane of the paper, as described below. The horizontally suspended elongated crystal or billet is supported at a location adjacent its center. Acceleration applied upward to such arrangement will tend to bend any free extremity of the crystal downwardly, i.e. toward the bottom of the drawing. FIGURE 1 illustrating this type of suspension, includes an arrangement for applying a compressive force to the longitudinal crystal axis and perpendicularly with respect to the direction of acceleration.

More particularly, the device shown schematically in FIGURE 1 includes a housing 10. A conventional supporting structure such as shaft 12, for the crystal 14 is secured to the bottom of the housing and may include a strap 15 for maintaining the crystal in its position, as shown. The crystal or billet has an elongated shape and may have any desired cross section, though it is assumed in FIGURE 1 that the cross section is circular. In accordance with the embodiment shown, there is an axial bore 16 provided through the crystal. In will be understood that the crystal has then the shape of a hollow cylinder. The inner and outer surfaces have been treated to receive a conductive layer, for example by electroplating or in any other suitable manner, to form electrodes, of which the inner electrode is designated 18 and the outer electrode is designated 20. Lines 22 and 24 connect each of the electrodes with a recording equipment designated by the block 25. By way of example, the output signal may be supplied to an amplifier conventional with this type of instrument, such as a cathode follower, of which the output, in turn, is used for monitoring or recording the signal obtained by accelerating the entire device shown in FIGURE 1 in a vertical direction in the plane of the paper and parallel to the supporting shaft 12.

In accordance with the invention, a significant improvement with respect to numerous properties of the accelerometer is achieved by applying a mechanical stress by means of a compressive force exerted on the ends of the crystal 14. In accordance with the embodiment illustrated in FIGURE 1, the compressive force is obtained by means of a wire 26 extending axially through the bore 16, with the wire being continuously maintained in a stretched condition. As stated above, application of the compressive force permits improving the sensitivity of the device by securing a mass to any of the free ends of the crystal whereby the flexure under the action of acceleration is increased. In the embodiment shown in FIGURE 1, two such masses 28 and 30 are employed and used also for maintaining the wire in its stretched state. For this purpose, each of the masses 28 and 30 is provided with an axial bore in which one end of the wire 26 is secured for example, by welding or brazing, as shown in FIGURE 1 with respect to mass 28 at location 32.

When assembling the crystal 16 with masses 28 and 30, and as a first step, one end of the wire is secured in the bore of one of the masses, subsequently the free end of the wire is passed through the bore in the crystal and the wire end pulled through the bore in the second mass. By stretching the wire and simultaneously securing it to the inner wall of the bore through the second mass, the assembly of FIGURE 1 is obtained. The wire is maintained in a continuously stretched state so that the masses exert a compressive force applied to the ends of crystal 14.

While the material used for the masses has no influence on the operation of the instrument, care must be taken that they do not short-circuit the electrodes represented by layers 18 and 20. This means that if metal is used for the masses, the electrodes should not extend to the very end of the crystal, as shown in FIGURE 3. Alternatively, perforated washers through which the wires 26 extend may be inserted at each end of the crystal between its front end and the mass, as shown in more detail and described below with respect to the embodiment of FIGURE 4.

FIGURE 2 illustrates a modified embodiment in which a cantilever type suspension and a solid crystal having no bore are used. The housing 10 has a mounting plate 34 secured to one of its side walls in which the crystal 14 is mounted in any conventional manner, for example by means of adhesive. In this type of suspension, only one weight 36 is used and the compressive force is exerted by a plurality of wires, two wires 38 and 40 being shown in FIGURE 2. One end of the wire 38 and 40 is secured to the mass 36 at locations 42 and 44, respectively, with the other end of the wires being secured to the mounting plate 34, as indicated at 46 and 48. In the embodiment shown in FIGURE 2 it is assumed that both the mass 36 and mounting plate 34 are made of metal and the wire ends may be secured to both of them in a convenient manner by welding, brazing or the like. In order to prevent short circuiting the electrodes represented by plated surfaces 50 and 52, the plated areas terminate a short distance from the metallic portions, as shown in FIGURE 2.

As described above, and in accordance with the invention, wires 38 and 40 are in a stretched state and thereby continuously maintain the billet 14 under the action of a compressive force. This is accomplished by first securing the wires to the mounting plate 34, with the wires having a length exceeding that required and shown in FIGURE 2. Subsequently, pressure is applied to the mass 36 in any convenient manner and the wires are secured to the mass at locations 42 and 44 by welding or brazing steps. Finally, the excessive lengths of the wires are cut off to obtain the arrangement shown in FIGURE 2.

It has been stated in the foregoing general discussion of the invention that significant advantages are achieved by providing a possibility to adjust the compressive force applied to the crystal. An embodiment incorporating an arrangement for this purpose is illustrated in FIGURE 3. In this figure, as in all the figures of the drawings, identical parts are identified by the same reference numerals, which include the housing 10, mounting plate 34, crystal 14, the mass 36 and plated electrodes 50 and 52. With respect to the shape of crystal 14 and mass 36, those shown in FIGURE 3 may have square cross sections as illustrated in FIGURE 4 with four tensioning wires 56, 58, 60, and 62 arranged as described above. However, any other suitable cross section may be selected. By way of example, in FIGURE 3, billet 14 may be a circular rod and the mass 36 may have the shape of a cylinder. Although four wires 56, 58, 60 and 62 have been mentioned and shown, the number of wires may be increased or decreased, as desired.

The arrangement for adjusting the tension of the wires and with it for controlling the compressive force applied to the crystal includes a regulating screw stud 64 passing through an opening in the side wall of housing 10 and engaging an internal thread provided through mounting plate 34. Inside the housing, stud 64 terminates in a flat enlarged portion 66 facing the left-hand end of crystal 14. The other end of stud 64 protruding outside the housing 10 has a knob 68 secured to it for conveniently adjusting the position of stud 64 and plate 66 with respect to the mounting plate.

It will be clear from the description of this arrangement that by regulating the position of the stud 64, using knob 68, the position of the end plate 66 can be adjusted in the direction of the crystal axis and the tensioning wires. Accordingly, the compressive force applied by wires 56, 58, 60 and 62 can be set so that the natural frequency of the cantilever type suspension of crystal 14 may be shifted to fall into different ranges, as discussed above.

In practice, and in accordance with a preferred embodiment, four stressing wires are used, as shown in FIGURE 4 which is an isometric partial view of the cantilever type suspended free end of crystal 14. Assuming that the mass 36 is made of metal, and that in this embodiment the plated areas acting as the electrodes 50 and 52 extend over the entire upper and lower surface of the crystal 14, an insulating washer 54 is shown inserted between the crystal 14 and the mass 36. In this embodiment, and as mentioned above, four wires 56, 58, 60 and 62 are employed for applying the compressive force to the crystal 14. They are secured, for example by welding or brazing, to the mass 36 in the areas of the four corners, as illustrated in FIGURE 4. The other end of the wires (not shown) may be fastened to the mounting plate 34 as described in connection with FIGURE 2.

It has been found that a certain advantage is achieved when using a crystal having rectangular cross section and suspending it in such a manner that the longer axis of the cross section forms a right angle with the direction of acceleration, as shown in FIGURE 4. It will be understood that an accelerometer is useful only when responsive to acceleration in one predetermined direction. It is known that, generally speaking, a rectangular body when suspended as described and shown in FIGURE 4 opposes less resistance to a bending force in the up-and-down direction indicated by arrow 70, as compared to a bending force applied horizontally. It is for this reason that, from a general point of view, the rectangular billet suspended as shown in FIGURE 4 constitutes a preferred embodiment of the invention when indicating accelerations applied in the direction of the arrow 70.

It is to be understood that the above described arrangements are illustrative of the application of the principles of the invention. Numerous other arrangements may be devised by those skilled in the art without departing from the spirit and scope of the invention. Thus, by way of example and not of limitation, the compressive force applied to the crystal in a direction perpendicular with respect to the acceleration axis may be supplied by springs or any other suitable means for accomplishing the desired result instead of the tensioning wires. Furthermore, other regulating devices may be substituted for the screw stud 64. It is stressed again that the drawing constitutes schematic views in which the shape and the proportions, for example of the housing and of the mounting arrangement for the crystal, may be modified in accordance with specific requirements. Furthermore, regulating arrangements such as a screw similar to that illustrated in FIGURE 3 for adjusting the compressive force applied to the crystal, either using tensioning wires or other equivalent means such as springs, may readily be incorporated in the embodiment of FIGURE 1. Even though the principles of the invention have been described in detail in connection with a cantilever type suspension for the crystal, arrangements can readily be designed for applying these principles to accelerometers using piezoelectric crystals in mushroom type or umbrella type suspensions.

The concept of stressing a piezoelectric crystal during operation, as described herein in connection with accelerometers, may be applied to piezoelectric transducers; generally speaking, this term encompasses energy transforming devices based on the piezoelectric effect, including, for example, microphones, force gauges, pressure gauges and the like. The improvements achieved, include increased mechanical strength, extension of the frequency range and adjustability of the range covered by the device. These advantages are applicable to many types of piezoelectric transducers, regardless of whether the output is read out directly on an indicating instrument, otherwise measured, permanently recorded, or supplied as the driving or controlling power for driving another unit, as in the case of a piezoelectric microphone used in conjunction with a loudspeaker.

Accordingly, from the foregoing remarks, it is to be understood that the present invention is to be limited only by the spirit and scope of the appended claims.

What is claimed is:

1. In an accelerometer, an elongated piezoelectric crystal having a bore extending along its longitudinal axis, cantilever type mounting means for supporting the crystal at one of its ends, a mass secured to the other crystal end, a wire extending through the bore and having one end secured to the mass with the other end being secured to the support, and means for exerting a pulling action on the wire for applying a compressive force to the crystal in the direction of its longitudinal axis.

2. In an accelerometer, an elongated piezoelectric crystal having a bore extending along its longitudinal axis, cantilever type mounting means for supporting the crystal at one of its ends, a mass secured to the other crystal end, a wire extending through the bore and having one end secured to the mass with the other end secured to the support, and means for adjustably displacing the crystal in the direction of its longitudinal axis, whereby a pulling action is exerted on the wire and an adjustable compressive force is applied to the crystal.

3. In an accelerometer, an elongated piezoelectric crystal having a longitudinal axis, cantilever type mounting means for supporting the crystal at one end thereof, a mass secured to the free end of the crystal, a plurality of wires extending alongside the crystal, one end of each wire being secured to the mass, the other end of each wire being secured to the support, and means for exerting a pulling action on the wires for applying a compressive force to the crystal.

4. In an accelerometer, an elongated piezoelectric crystal having a longitudinal axis, cantilever type mounting means for supporting the crystal at one end thereof, a mass secured to the free end of the crystal, a plurality of wires extending alongside the crystal, one end of each wire being secured to the mass, the other end of each wire being secured to the support, means for selectively displacing the crystal in either of both directions of its longitudinal axis, whereby an adjustable pulling action is exerted on the wires with an adjustable compressive force being applied to the crystal, and means including a pair of electrodes for producing and recording electrical signals indicative of crystal flexure resulting from acceleration conditions.

5. An accelerometer, comprising a housing, an elongated piezoelectric crystal having a longitudinally extending bore through it, support means in the housing for suspending the crystal at a location adjacent its center to provide a T-shaped mounting configuration, a mass arranged at each end of the crystal, and a wire extending through the bore, each wire end being secured to one of the masses, the wire being maintained in a stretched state to apply a compressive force to the crystal.

6. A accelerometer, comprising a housing, an elongated piezoelectric crystal having a longitudinal axis, support means secured to one wall of the housing and engaging one end of the crystal to provide a cantilever type suspension for the crystal, with the other, free crystal end protruding across the space in the housing, a mass arranged at the protruding crystal end, a plurality of wires, each wire having one end secured to the mass and the other end secured to the housing wall, and a regulating screw cooperating with the housing wall for adjusting the position of the crystal in the direction of its longitudinal axis, whereby the wires are stretched and a compressive force is applied to the crystal.

References Cited by the Examiner

UNITED STATES PATENTS

| 2,313,893 | 3/43 | Rushing | 73—71.2 |
| 2,478,223 | 8/49 | Argabrite | 310—8.4 |
| 2,681,566 | 6/54 | Ruge | 73—514 |
| 2,836,738 | 5/58 | Crownover | 310—8 |
| 2,878,451 | 3/59 | Butterworth | 73—71.4 |
| 2,955,216 | 10/60 | Dieter | 310—9.4 |

FOREIGN PATENTS

| 747,008 | 9/44 | Germany. |
| 763,226 | 12/56 | Great Britain. |

RICHARD C. QUEISSER, *Primary Examiner.*

S. LEVINE, JAMES J. GILL, *Examiners.*

UNITED STATES PATENT OFFICE
CERTIFICATE OF CORRECTION

Patent No. 3,186,237　　　　　　　　　　　　　　　　June 1, 1965

Lew Forrest

It is hereby certified that error appears in the above numbered patent requiring correction and that the said Letters Patent should read as corrected below.

Column 3, line 67, after "may" insert -- be used in connection with --.

Signed and sealed this 21st day of December 1965.

(SEAL)
Attest:

ERNEST W. SWIDER
Attesting Officer

EDWARD J. BRENNER
Commissioner of Patents